United States Patent [19]

Eldering et al.

[11] 4,430,000

[45] Feb. 7, 1984

[54] RADIATION MEASURING SYSTEM

[75] Inventors: Herman G. Eldering, Chelmsford; Arthur W. Kliman, Beverly, both of Mass.

[73] Assignee: Baird Corporation, Bedford, Mass.

[21] Appl. No.: 226,070

[22] Filed: Jan. 19, 1981

[51] Int. Cl.$^3$ .......................... G01J 1/10; G01D 5/32
[52] U.S. Cl. ................................... 356/236; 250/233
[58] Field of Search .............. 356/236, 216, 215, 217, 356/225; 250/233

[56] References Cited

U.S. PATENT DOCUMENTS

| | | | |
|---|---|---|---|
| 2,515,762 | 7/1950 | Dimmick | 356/236 |
| 3,327,583 | 6/1967 | Vanderschmidt et al. | 356/236 |
| 4,076,421 | 2/1978 | Kishner | 356/236 |

Primary Examiner—Bruce Y. Arnold
Attorney, Agent, or Firm—Morse, Altman & Dacey

[57] ABSTRACT

A system for measuring radiation in the laboratory or at a site to aid in determining whether to erect a solar energy installation at that site includes a positioner and a sensor. The sensor, which is mounted on the positioner, includes a rotating semispherical chopper and an integrating sphere for collecting radiation in three modes. A broad-band detector measures the irradiance from the integrating sphere to monitor for anomalies. A pair of monochromators simultaneously measure, one in the visible range and the other in the infrared range, the spectral irradiance from the integrating sphere. Processing electronics process the measured spectral irradiance from the monochromators and generate data signals for providing an absolute irradiance spectrum at the plane of the entrance aperture. The absolute irradiance spectrum is inputted to an X-Y plotter and a magnetic disc and tape. The system further includes internal reference sources providing continuous wavelength and irradiance calibration.

10 Claims, 7 Drawing Figures

FIG. 7
ONE MEASUREMENT CYCLE

| A | B | C | D |
|---|---|---|---|
| DARK | MEASURE | WAVE LENGTH CAL. | REF. CAL. |

RADIATION MEASURING SYSTEM

BACKGROUND OF THE INVENTION

1. Field of the Invention

The present invention relates generally to radiation measuring systems and, more particularly, is directed towards a system for measuring available solar flux at a site to aid in the determination whether to erect a solar energy installation at that site.

2. The Prior Art

Heretofore available solar flux measuring systems have been complex and expensive instruments that, despite their complexity, have nevertheless exhibited a major disadvantage in obtaining reliable and accurate solar spectra on a consistent basis. This major disadvantage has involved anomalous attenuations occurring in the measurements of solar spectra due to the occasional presence of haze and clouds in the sky, and the unwanted presence of birds and bugs and their droppings on the entrance apertures of these instruments. Also, most of these prior art instruments have failed to incorporate proper irradiance standards and reference illumination levels, and none has provided, as far as known, continuous wavelength calibration to assure obtaining accurate, reliable solar spectra on a regular basis.

Model reference systems (i.e., computer simulations of ideal systems whose responses are agreed to be optimum) in lieu of instruments, on the other hand, can be useful provided they account for most, if not all, of the minor effects, such as micrometeorology and the albedo of the surrounding terrain. In such an event, however, the models become too complex. The models also require the employment of a large data base in order to be of any use at all.

SUMMARY OF THE INVENTION

It is a principal object of the present invention to overcome the above disadvantages by providing a radiation measuring system for measuring available flux in the laboratory or at a site before committing funds for the erection of a solar energy installation at that site and to provide calibrated spectra of other sources by the employment of internal reference sources.

More specifically, it is an object of the present invention to provide a radiation measuring system that is relatively simple and yet produces reliable and accurate spectra on a consistent basis.

It is a further object of the present invention to provide a radiation measuring system that includes a broadband detector to measure total irradiance over the spectral range and to provide assurance of the absence of temporal anomalies that can, if present, adversely affect the accuracy and reliability of radiation measurements by the system.

It is yet another object of the present invention to provide a radiation measuring system that includes proper irradiance standards, reference illumination levels and dynamic wavelength calibration to assure obtaining accurate, reliable spectra on a consistent basis.

The radiation measuring system of the invention is particularly adapted for measuring available solar flux at a site to aid in determining whether to erect a solar energy installation at that site. The radiation flux measuring system of the invention comprises a sensor mounted on a positioner. The sensor includes a diffuser for collecting solar radiation. The diffuser is preferably an integrating sphere with a 180° field of view and a cosine response. A semispherical chopper is rotatably mounted about the integrating sphere in order periodically to interrupt the collection of solar radiation by the integrating sphere. A pair of monochromators simultaneously measure, one in the visible range and the other in the infrared range, the spectral irradiance collected by the integrating sphere. A circuit converts the measured spectral irradiance signals from the monochromators into data signals suitable for computer use. A programmable microcomputer processes the data signals and produces an absolute irradiance spectrum for the plane of the entrance aperture. The absolute irradiance spectrum is outputted to an X-Y plotter for immediate use or on a magnetic disc and tape for storage and later use.

The sensor also includes a broad-band detector to measure the irradiance collected by the integrating sphere at all wavelengths simultaneously over the spectral sensitivity range of the detector. A one to five percent dip in the irradiance spectra at a critical point is detected by this broad-band detector and is recorded on the X-Y plotter in real time for immediate on-site analysis and corrective action. System control for the radiation measuring system is via a keyboard and the printer terminal where all system parameters are recorded.

The radiation measuring system of the invention is thus a system that produces reliable and accurate radiation spectra on a consistent basis and yet is relatively simple and economical.

BRIEF DESCRIPTION OF THE DRAWINGS

For a fuller understanding of the nature and objects of the present invention, reference is made to the following specification, which is to be read in reference to the accompanying drawings, wherein.

DETAILED DESCRIPTION OF THE PREFERRED EMBODIMENT

Figure 1:
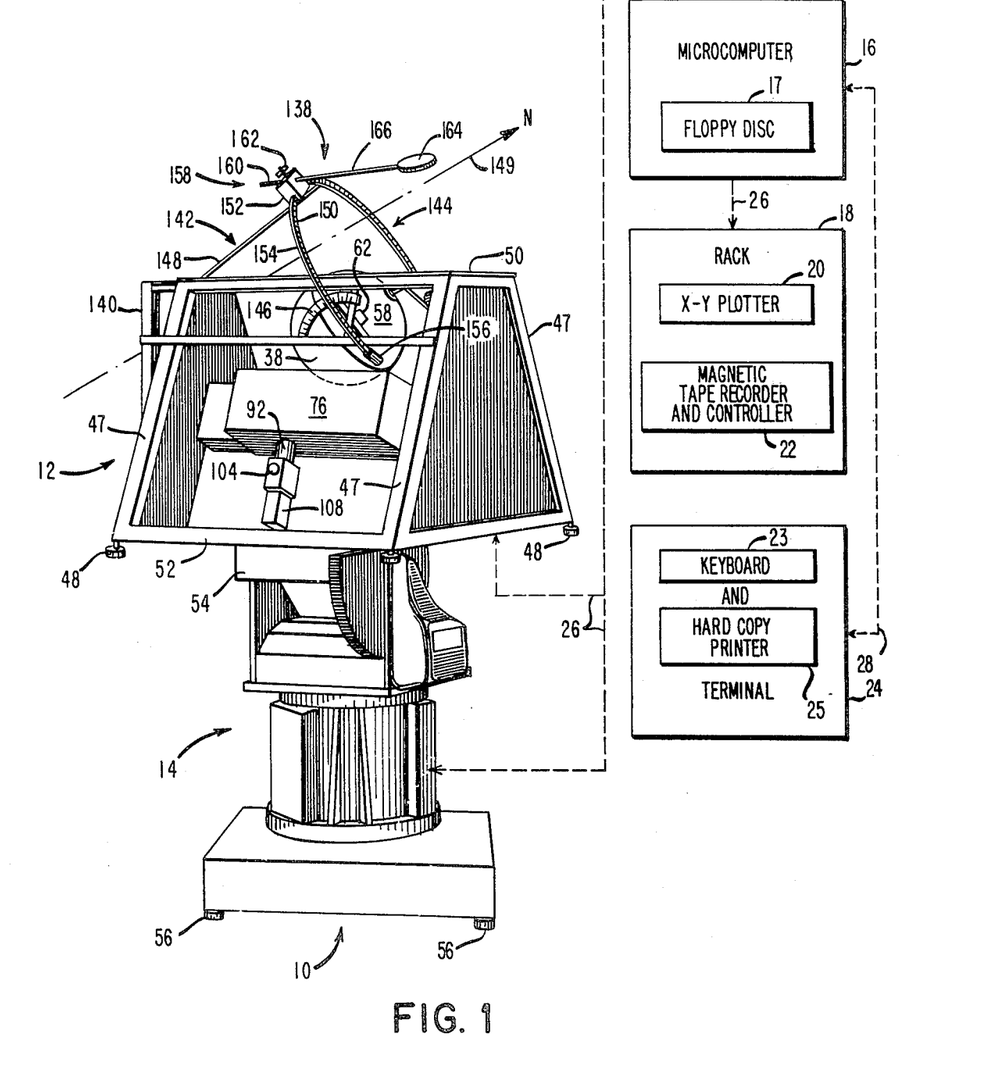
FIG. 1 is a block and perspective view of a radiation measuring system embodying the invention.
Figure 2:
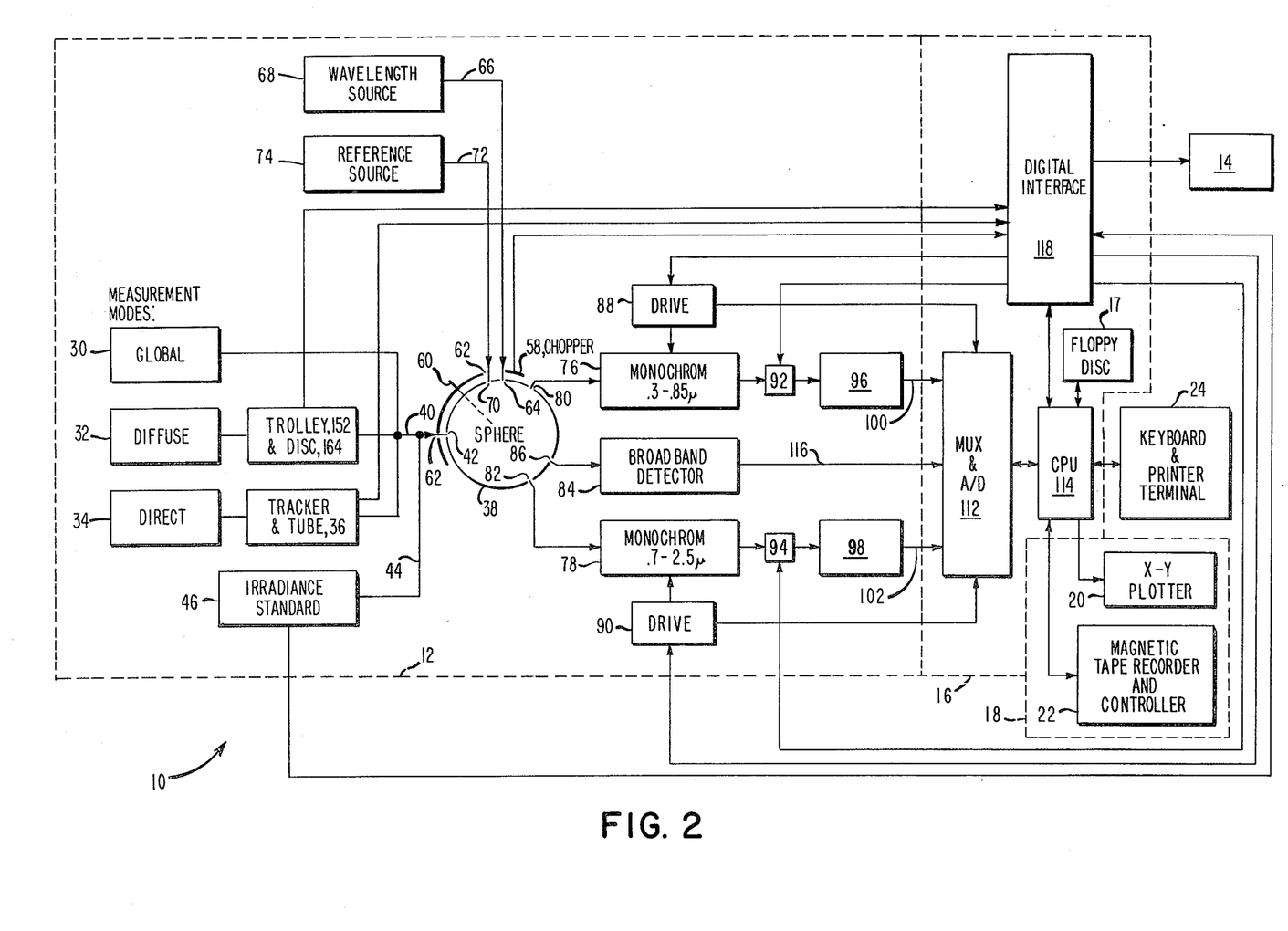
FIG. 2 is a schematic diagram of the radiation measuring system of FIG. 1.

A preferred embodiment of a radiation measuring system 10 is shown in a block and perspective view in FIG. 1 and a schematic diagram of the system 10 is shown in FIG. 2. The radiation measuring system 10 is designed for measuring the available flux at a site or in the laboratory. Preferably, the radiation measuring system 10 essentially comprises a sensor 12, shown mounted on an elevation and azimuth positioner 14, a programmable microcomputer 16, an ancillary rack 18 containing an X-Y plotter 20 and a magnetic tape recorder and controller 22, and a terminal 24 having a keyboard 23 and a hard copy printer 25. The sensor 12 is connected to microcomputer 16 and to the instrument rack 18 by cables 26 illustrated by dashed lines in FIG. 1. The cables 26 are preferably fifty feet long, or longer, to allow for a somewhat distant placement of the sensor 12 from the instrumentation. The terminal 24 is also provided with a cable 28 connecting it to the microcomputer 16. This cable 28 is also preferably fifty feet long, or longer, so that it can be positioned adjacent the sensor 12 or the rack 18. System and recording control for the radiation measuring system 10 is effected via the keyboard 23 of the terminal 24.

The radiation measuring system 10 is designed to make insolation measurements in three principal modes: a diffuse mode 32 measuring all but the sun's illumination, a direct mode 34 measuring only the sun's illumination, and a global mode 30 measuring, in effect, a combination of the other two modes 32 and 34. The system 10 can also be used in the tilted-fixed-global mode or in the global-tracking mode. It is only in the direct mode 34 that the elevation and azimuth positioner 14 and a solar tube attachment 36 (FIG. 5) are required. Consequently, at sites where direct mode 34 insolation measurements are not needed, the positioner 14 can be dispensed with and the sensor 12 operated without it, as will be more fully apparent below.

The sensor 12 includes an integrating sphere 38 (acting as a diffuser), with a 180° field of view and a cosine response, for collecting radiation 40 in one of the aforementioned modes. A diffuser is defined as a vessel whose inside surface has a diffusely reflecting finish to produce a diffuse reflection, which is the reflection of light from a surface in all directions according to the cosine law. The cosine law states that the energy emitted by a radiating surface in any direction is proportional to the cosine of the angle which that direction makes with the normal. Thus, in a diffuser represented by a perfect integrating sphere, a measurement of illumination due to reflected light on any part of the sphere wall gives the total flux from a source of illumination irrespective of its distribution. In a practical sense, this can best be approximated by minimizing the area of apertures in the sphere relative to the total sphere area and providing a sphere that possesses a nearly diffuse inside surface of high reflectance. The integrating sphere 38 is provided with an entrance aperture 42 to admit therein the radiation 40 or radiation 44 originating from an irradiance standard source 46. The radiation 44 from the source 46 provides absolute spectral irradiance calibration to the solar flux measuring system 10. Preferably, the irradiance standard source 46 is a quartz-iodide lamp, removably mounted adjacent the entrance aperture 42, and traceable to the National Bureau of Standards. Absolute spectral irradiance calibration to the system 10 should be done during set-up and installation at a new site and also periodically thereafter to assure the continued accuracy and reliability of the system 10.

The integrating sphere 38 of the sensor 12 is stationarily mounted to an inverted U-shaped main frame 47. The main frame 47 is provided with suitable adjustable mounting flanges 48 designed to secure the sensor 12, where the positioner 14 is not needed, at a site so that its top plate or skin 50 is level. The main frame 47 is also provided with a bottom plate 52 by means of which the sensor 12 is secured to a platform 54 of the positioner 14. The elevation and azimuth positioner 14 is also provided with suitable adjustable mounting flanges 56 designed to assure the level mounting of its platform 54 and hence the skin 50. The level mounting of the skin 50 is important to assure the 180° field of view to the integrating sphere 38 in the global mode 30 and in the diffuse mode 32 of insolation measurements.

Figure 3:
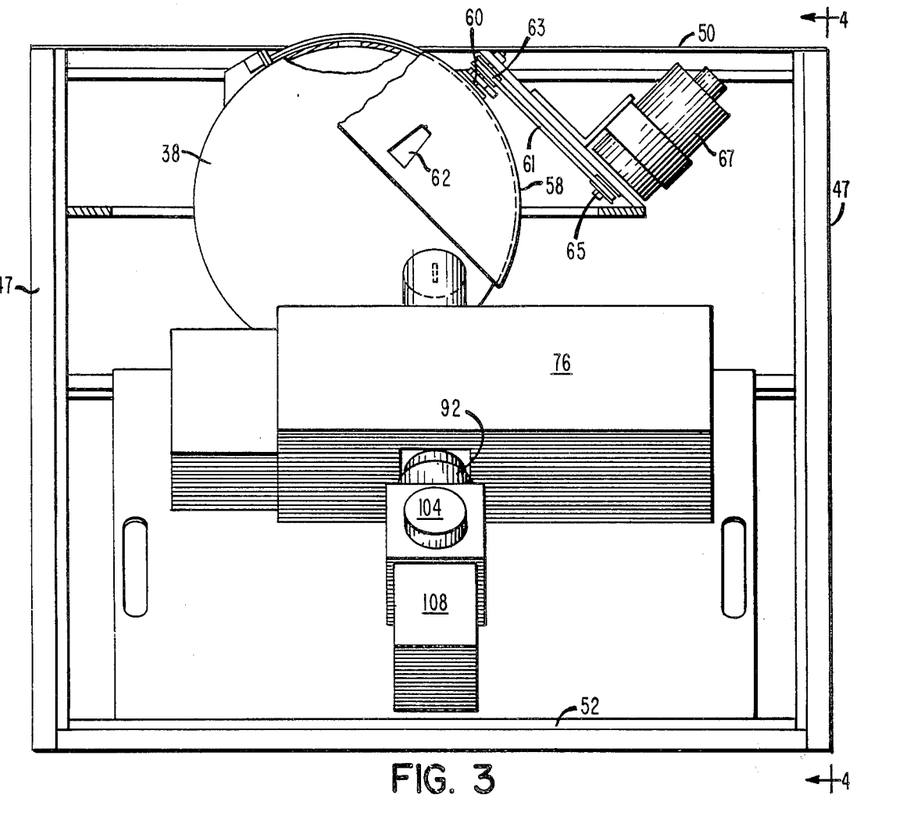
FIG. 3 is an elevational view, partly in section, and on an enlarged scale, of a portion of the radiation measuring system shown in FIG. 1.

As may be best noted in FIG. 3, a semispherical chopper 58 is rotatably mounted about the integrating sphere 38. The chopper 58 covers somewhat less than half of the sphere 38 and is arranged at an angle with respect to the vertical axis of the sphere 38. The chopper 58 is secured at its apex to a shaft 60. The shaft 60 is in turn rotatably mounted to the main frame 47. A belt 61, trained over a pair of pulleys 63 and 65 and driven by a motor 67, rotates the shaft 60, and thereby the chopper 58. The chopper 58 is, furthermore, provided with a pair of windows 62 designed to rotate over the entrance aperture 42 (observe FIG. 3) of the integrating sphere 38 so as to permit the entry of radiation 40 into the sphere 38 during the time interval that one of the pair of windows 62 is above the aperture 42. During the remaining time interval of the chopper's 58 rotation over the entrance aperture 42, no solar radiation 40 collection by the integrating sphere 38 can take place. The integrating sphere 38 is also provided with two further entrance apertures 64 and 70 (note FIG. 2) in the line of sight of the windows 62. Aperture 64 periodically admits illumination 66 emanating from a highly structured spectral source 68, functioning as a wavelength calibration source, such as a mercury (Hg) lamp, or a laser diode, characterized by having strong emission lines. The highly structured spectral source 68 in the alternate comprises a broad source filament lamp, not shown, in combination with a structured spectral filter possessing strong absorption bands. Aperture 70 periodically admits illumination 72 emanating from a reference source 74. The wavelength calibration source 68 is designed to provide dynamic, e.g., continuous wavelength calibration with a chopped signal, to the radiation measuring system 10. The reference source 74 preferably is a highly stable continuous source and is designed to provide a reference illumination level to the radiation measuring system 10.

A pair of monochromators 76 and 78 simultaneously measure the spectral irradiance collected by the integrating sphere 38 via a pair of measurement apertures 80 and 82, respectively. In addition, a broad-band detector 84 also measures, via a further measurement aperture 86, the irradiance collected by the integrating sphere 38 at all wavelengths simultaneously with the pair of monochromators 76 and 78, in order to monitor for anomalous attenuations in the irradiance spectra occurring at critical points. Such anomalous attenuations of 1 to 5 percent can be caused by haze or thin clouds in the sky or by a bug or bird or their droppings on the entrance aperture 42 of the integrating sphere 38. These anomalous attenuations of 1 to 5 percent of the solar energy are difficult to perceive visually because human vision cannot detect contrasts below the 2 to 5 percent level.

The pair of monochromators 76 and 78, each with aspheric mirrors, measure irradiance in the spectral range from about 0.3 micron (u) to about 2.5 microns. One monochromator 76 measures the visible range from about 0.3 u to about 0.85 u, and the other monochromator 78 measures the infrared range from about 0.7 u to about 2.5 u. Monochromator 76 preferably has a grating having 1200 grooves per mm, with a blaze of 300 nanometers (nm). Monochromator 78 has a grating having 600 grooves per mm, and is blazed at 1.0 u. (A blaze of grating technique is a technique whereby the rules grooves of a diffraction grating are given a controlled shape so that they reflect as much as 80% of the incoming light into one particular order for a given wavelength.) Each of the monochromators 76 and 78 is independently driven with a separate drive 88 and 90, respectively. The combined scan time for both monochromators 76 and 78 is about 2.38 minutes. Each of the monochromators 76 and 78 is provided with a set of order isolation filters 92 and 94 respectively, that are rotated into the optical paths of the respective monochromators 76 and 78 at the appropriate times when wavelength scanning is halted.

In arranging the location of the several apertures 42, 64, 70, 80, 82 and 86 in the integrating sphere 38, the viewing orientation is such that no measurement apertures 80, 82 and 86 has a direct view of any of the entrance apertures 42, 64 and 70. In addition, a baffle, not shown, is preferably introduced into the integrating sphere 38 so that no measurement aperture 80, 82 and 86 is to view a direct illuminated portion of the integrating sphere 38 from apertures 42, 64 and 70.

Figure 4:
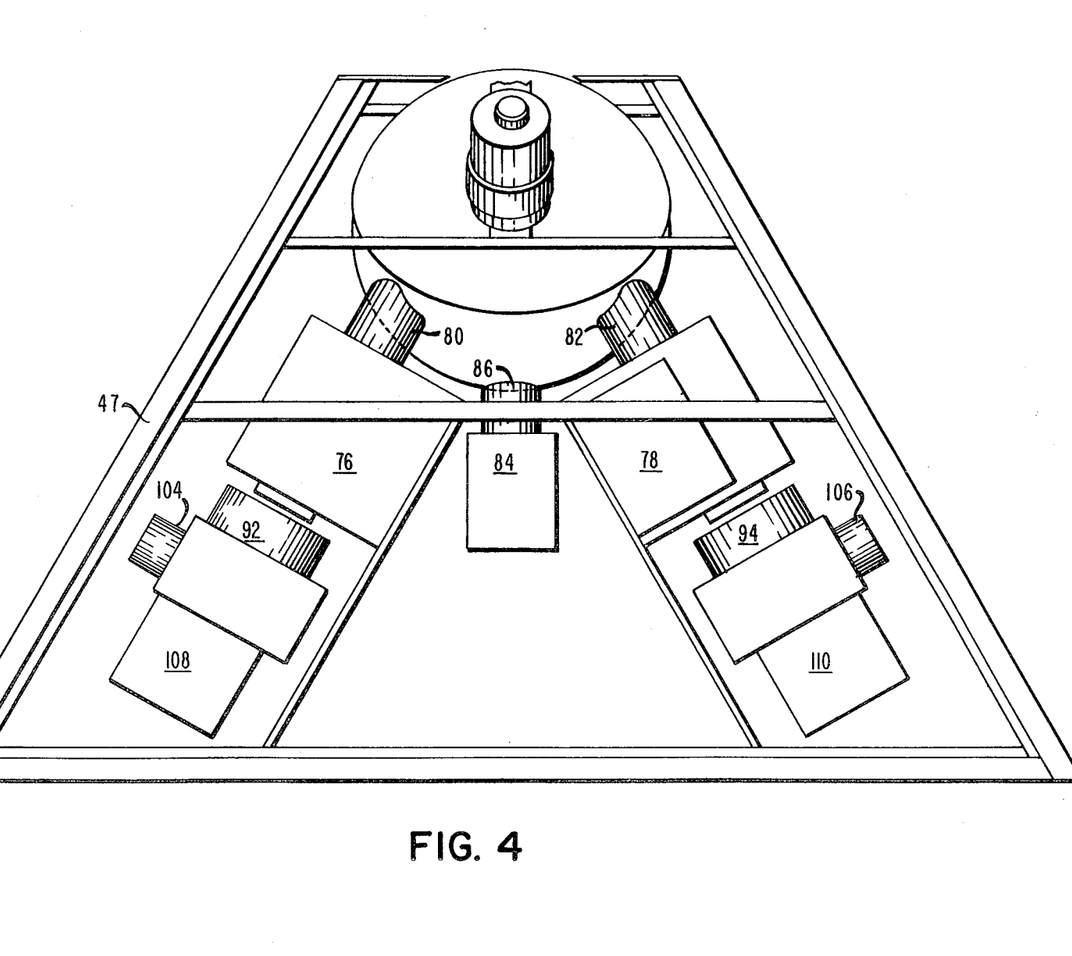
FIG. 4 is a view similar to that shown in FIG. 3 but viewing it from the right-hand side thereof.

A processing circuit 96 and 98, respectively, for each of the monochromators 76 and 78 converts the measured spectral irradiance passing through the filters 92 and 94 into signals 100 and 102 suitable for use by the microcomputer 16. Each of these circuits 96 and 98 includes a detector 104 and 106, a cooler 108 and 110 for each of the detectors 104 and 106, (note FIGS. 3 and 4) and an A.C. amplifier 105 and 107 (note FIG. 2), respectively. Detector 104 in the circuit 96 is a gallium arsenide photomultiplier tube as that provides a stronger and more reliable signal at the long wavelengths in the visible range than do other detectors. Detector 106 in the circuit 98 is, on the other hand, a lead sulphide (PbS) detector, while the broad-band detector 84 is a silicon detector.

All radiation collected by the integrating sphere 38 is chopped by the rotating chopper 58 and includes both dark and radiation levels. Consequently, simple and reliable A.C. amplifiers 105 and 107 are used to raise the signals 100 and 102 to suitable levels for digital conversion. Digital conversion is effected by a combined multiplexer and analog to digital converter (Mux & A/D) 112 before the signals 100 and 102 are processed by the central processing unit (CPU) 114 of the microcomputer 16. The broad-band detector 84 also incorporates an A.C. amplifier for the same purpose before its signal 116 is fed to the multiplexer and A/D converter 112 and hence to the CPU 114. The signals 100, 102 and 116 are processed by the CPU 114.

The measuring system 10 has two forms of output: (1) an absolute irradiance plot on the X-Y plotter 20 available locally to allow revision in the set-up and/or the procedure should unusual or unexpected results be recorded, and (2) a multitrack digital magnetic tape of the entire spectra produced on the magnetic tape recorder 22 and available for dissemination and for later use on an alternate computer. The multitrack digital magnetic tape is a nine track, phase encoded digital magnetic tape capable of handling 1600 bits per inch, and has a recording capacity of at least 24 spectral scans.

Figures 5, 6, 7:
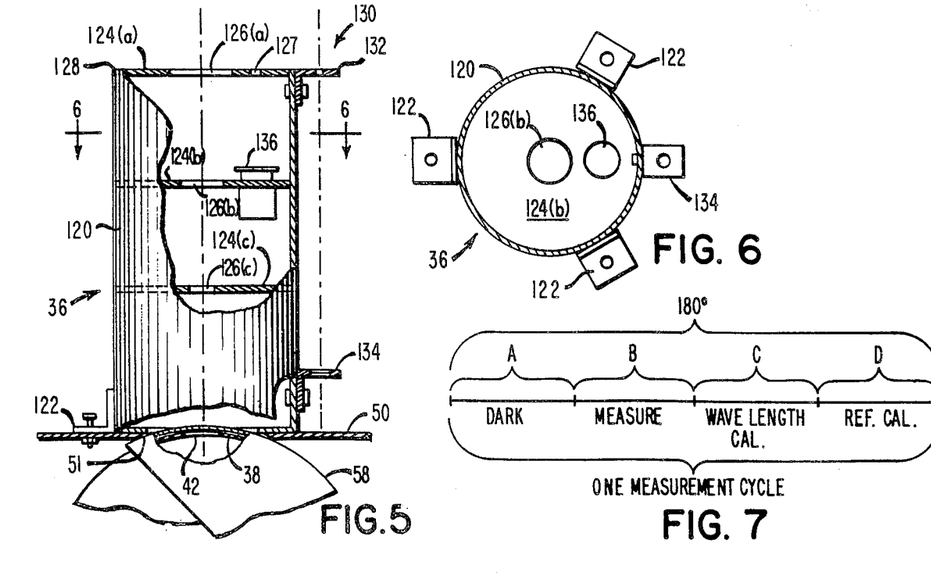
FIG. 5 is an elevational section of a solar tube attachment for the radiation measuring system of FIG. 1, with the solar tube shown mounted in place on the system.
FIG. 6 is a sectional view along the lines 6—6 of the solar tube attachment shown in FIG. 5.
FIG. 7 is a schematic representation of an insolation measurement cycle effected by the radiation measuring system of FIG. 1.

The CPU 114 is used in a real time operating manner and the programs are written in assembler and FORTRAN. FORTRAN (FORmula TRANslation) is a higher level computer programming language oriented toward engineering and scientific applications which require a large amount of numeric computation. These computer programs provide desired and much valued user flexibility in system operation. Several such computer programs are provided for the operation of the radiation measuring system 10. These include a wavelength calibration program, a spectral irradiance calibration program and a solar radiation measurement program. These computer programs combine to read the data obtained by the sensor 12 and to convert the data into the two above-mentioned output formats (1) and (2) and also into a hard copy output at the keyboard and printer terminal 24. The computer programs, with the aid of a digital interface module 118, also control the radiation measuring system 10 so as to: monitor the wavelengths of the monochromators 76 and 78 when making measurements; select the respective order isolation filters 92 and 94 as required at particular times; control the spectral scanning drives 88 and 90; sense whether the solar tube attachment 36 or a yet to be described solar disc or the calibration lamp 46 is in place; and also calibrate the radiation measuring system 10. The microcomputer 16 also includes a magnetic floppy disc 17 and a dual density floppy disc drive, a real time clock, and a power-fail circuit, all conventional to those skilled in the art and hence not separately illustrated.

As already mentioned, the radiation measuring system 10 is designed to make insolation measurements in several modes, and that it is only in the direct mode 34 of measurement that the elevation and azimuth positioner 14 and the solar tube attachment 36 are required. In the direct mode 34 of insolation measurement, the entrance aperture 42 of the integrating sphere 38 is trained directly at the sun by the positioner 14. The positioner 14 is an altazimuth mounted tracker. The altazimuth mount is a two-axis mount that uses the plane of the horizon as the azimuth plane, with angles measured from the due north position. The altitude, on the other hand, is measured in angle elevation from the horizon to the zenith. In order to track the sun, or other celestial body, with an altazimuth mount, both coordinates must be appropriately driven with a variable speed drive.

The field of view (FOV) of the integrating sphere 38 in the direct mode 34 of measurement is set at one degree (1° FOV) by the solar tube attachment 36. The solar tube attachment 36 (observe FIGS. 5 and 6) comprises a tube 120 designed to be secured over a hole 51, formed in the skin 50, by a plurality of suitable fasteners 122. The hole 51 is large enough to accommodate not only the entrance aperture 42 of the stationarily mounted integrating sphere 38, but also the rotatably mounted semispherical chopper 58. A series of baffle plates 124(a), 124(b), and 124(c), having central apertures 126(a), 126(b) and 126(c), are mounted in the tube 120. The size of the apertures 126(a), 126(b) and 126(c), in conjunction with that of the entrance aperture 42, determine the 1° FOV of the integrating sphere 38 in the direct measurement mode 34. A visual alignment assembly 130, comprising a pinhole mount 132 and a cross hair mount 134 attached to the outside of the tube 120, is provided to give a quick, rough orientation to the solar tube attachment 36 so as to obtain the sun within the field of view of a position sensor 136. The position sensor 136 is mounted adjacent the central aperture 126(b) on the baffle plate 124(b) and views the sun through an aperture 137 in the baffle plate 124(a). Position sensor 136, with its accompanying amplifiers, generates analog signals proportional to the sun's position.

These analog signals are fed to the CPU 114 via the A/D converter 112. An algorithm using this data then causes to drive the positioner 14 to track the sun to better than 0.02 degrees.

As already stated, in the global mode 30 and in the diffuse mode 32 of insolation measurements, the positioner 14 is not needed. What is important in these two modes 30 and 32 is that the skin 50 of the sensor 12 be exactly level to the ground and that the upper surface of the skin 50 be exactly tangential to the plane of the entrance aperture 42 of the integrating sphere 38. These twin requirements of the skin 50 being level with respect to the ground and also being tangential to the entrance aperture 42 are needed to ensure an unobstructed 180° FOV to the entrance aperture 42. With the skin 50 level, the sensor 12 of the solar flux measuring system 10 is ready to effect insolation measurements in the global mode 30. In this mode 30, nothing is mounted on the skin 50 that would obstruct the 180° FOV of the entrance aperture 42 of the integrating sphere 38.

Furthermore, and as may be noted with particular reference to FIG. 5, the requirement for an unobstructed 180° FOV for the entrance aperture 42 necessitates that the skin 50 be exactly tangential to the entrance aperture 42 of the integrating sphere 38. In the diffuse mode 32 of insolation measurement, a diffuse measurement module 138 is needed to effect a one degree obscuration of the sun. The purpose of the diffuse mode 32 is to measure all illumination except illumination emanating directly from the sun. The module 138 is externally mounted onto the main frame 47 of the sensor 12, as may be best observed in FIG. 1. The diffuse measurement module 138 comprises a module frame 140 that supports and secures to the main frame 47 a latitude adjustment assembly 142 and a trolley rail assembly 144. The latitude adjustment assembly 142 preferably includes a scale 146 and a latitude adjustment rod 148. The trolley rail assembly 144 includes a semicircular track 150 secured to the module frame 140 at its ends and to one end of the rod 148 at its apex. The other end of the rod 148 is adjustably secured to the module frame 140. Assembly 144 further includes a trolley 152 movably mounted on the track 150 and a drive cable 154 secured within the track 150 and connected to the trolley 152. A motor 156 drives the drive cable 154 and thereby the trolley 152. Assembly 144 also includes a declination subassembly 158. The declination subassembly 158 includes a rod 160 that is slidably mounted within the trolley 152 by a retaining member 162. A disc 164 is secured to the rod 160 at one end. The rod 160 preferably is provided on its surface with a scale 166 by which the declination angle of the disc 164 is adjusted. The rod 160 is a section of a circle having a specific radius, thus maintaining a constant distance between the disc 164 and the entrance aperture 42 for all latitude and declination adjustments.

The trolley rail assembly 144 is a one-axis sun tracking system but is an equatorial mount having a polar axis 149 that is to be aligned to point at the celestial north N (and hence is parallel to the earth's axis) and a declination axis normal to the prior axis 149 The object of the trolley rail assembly 144 is to have the solar disc 164 move about the track 150 following the sun so as continuously to cast its shadow over the entrance aperture 42 of the integrating sphere 38. The result is a diffuse mode 32 of insolation measurement, with a 180° FOV less the one (1°) degree of obscuration effected by the solar disc 164.

System Set Up and Operation

During transport, the skin 50 of the sensor 12 is covered by a protective cap (not shown) that provides both a light-tight seal, and more importantly, a weather seal over the entrance aperture 42 of the integrating sphere 38. Immediately following the set-up of the radiation measuring system 10 at a new site, the system 10 has to be calibrated. Calibration is done by effecting an absolute spectral irradiance calibration to the entire system 10 by removing the protective cap and mounting the irradiance standard source 46 (see FIG. 2) over the entrance aperture 42. As previously stated hereinabove, the irradiance standard source 46 is a quartz-iodide lamp traceable to the National Bureau of Standards. The source 46 is characterized by possessing an irradiance standard of one (1) solar constant. (A solar constant is defined as the rate at which energy from the sun is received just outside the earth's atmosphere on a surface normal to the incident radiation and at the earth's mean distance from the sun. One solar constant is 0.140 watts per square centimeter.) Thus, the irradiance standard source 46 provides signal levels to the system 10 which are comparable to that produced by the sun. The spectral radiation 44 from the irradiance standard source 46, and collected by the integrating sphere 38, is scanned by the pair of monochromators 76 and 78, and a spectral calibration program is executed by the microcomputer 16. Measured values of the spectral radiation 44 are compared to table values previously derived for the spectral radiation 44 and the required calibration adjustments effected. Preferably, such absolute spectral irradiance calibration is to be verified periodically thereafter to assure the continued accuracy and reliability of the radiation measuring system 10. The frequency of doing spectral irradiance calibrations depends only on the stability of the reference source 74, assuming that the standard 46 is unchanged.

Following the absolute spectral irradiance calibration, the irradiance standard source 46 is removed from the skin 50 and the radiation measuring system 10 is ready to do solar radiation 40 measurements in one of the mentioned three modes 30, 32 and 34. Of course, only one type of measurement can be made at one time. The operator selects the type of insolation measurement to be made and enables all necessary system 10 components: the positioner 14, the solar tube attachment 36 or the diffuse measurement module 138 including the solar disc 164, the X-Y plotter 20 and the magnetic tape recorder 22. All measurements are, of course, initiated at the keyboard 23 of the keyboard and hard copy printer terminal 24. The operator enters at the keyboard terminal 24 the date, the time and all comments for recording on the magnetic tape. If making an insolation measurement in the direct mode 34, the operator assures: that the drives of the positioner 14 are properly set for the latitude of the observing site, that the declination setting is effected for the particular day of the year, and that the scan axis is set for the hour angle of the sun.

If making an isolation measurement in the diffuse mode 32, the operator assures: that the diffuse measurement module 138 is in place over the skin 50 of the sensor 12, that the skin 50 is level, that the latitude of the track 150 is set along the scale 146 for the latitude of the observing site by the latitude adjustment rod 148, that the declination setting for the solar disc 164 is effected against the scale 166 marked on the rod 160, and that the trolley's 152 position along the track 150 is set for the hour angle of the sun. If making an insolation measurement in the global mode 30, the operator assures: that the skin 50 of the sensor 12 is level and that no attachment is mounted on the skin 50. As already stated, the integrating sphere 38 has a 180° FOV and a cosine response. The operator checks this cosine response of the integrating sphere 38 by measuring it at 45° intervals in the plane of the horizon and by measuring the cosine response continuously in angle elevation from the horizon to the zenith.

In each of the three measurement modes 30, 32 and 34, a dynamic (i.e., continuous) wavelength calibration of the radiation measuring system 10 is continuously effected with chopped signals produced by the rotating semispherical chopper 58. This is best explained with particular reference to FIGS. 2 and 7. As already mentioned, the integrating sphere 38 is provided with three apertures 42, 64 and 70 for admitting radiation: the entrance aperture 42 to admit external radiation 40, the aperture 64 to admit the illumination 66 of the wavelength calibration source 68, and the aperture 70 to admit the illumination 72 from the reference source 74. Each of these three apertures 42, 64 and 70 is, for the most part, obscured by the rotating chopper 58. The chopper's 58 pair of windows 62, formed 180° apart, periodically uncover each of the three apertures 42, 64 and 70 in a manner so that each measurement cycle includes four alternate measurement segments A, B, C, and D, observe FIG. 7. During the dark measurement segment A, no radiation from any source is allowed by the chopper 58 to enter the integrating sphere 38. During the next measurement segment B, external radiation 40 in one of the three modes 30, 32 or 34 is allowed to enter and be measured through the entrance aperture 42 into the integrating sphere 38. During the succeeding measurement segment C, the illumination 66 from the wavelength calibration source 68 is admitted into the integrating sphere 38 via the aperture 64. During the final measurement segment D of the measurement cycle, the illumination 72 from the reference source 74 is admitted into the integrating sphere 38 via the aperture 70, Consequently, the entire spectral range of external radiation 40, collected by the integrating sphere 38 and measured by the pair of monochromators 76 and 78, is referenced to a dark measurement level and two illumination measurement levels: a wavelength illumination level and a reference illumination level. Due to this dynamic calibration with chopped signals, the measurement accuracy of the flux measuring system 10 is better than ±5% for the operation of the entire system 10 as compared to the irradiance calibration standard 46.

Total spectral response calibration, employing the irradiance standard source 46, is preferably performed with two different lamps to assure that a quartz-iodide lamp supplied with the radiation measuring system 10 is a valid standard. Dynamic wavelength calibration, employing the mercury (Hg) lamp 58, is also preferably performed with other spectral sources during system installation to verify the calibration of the memory lamp 68.

As the spectral scan is effected by the pair of monochromators 76 and 78, data is recorded on a dual density floppy disc 17. When the scan is complete, that data is reduced and outputs either the X-Y plotter 20 for local use and analysis or the magnetic tape 22. The data stored on the magnetic tape 22 is for storage or for subsequent use on alternate computers for further processing and to facilitate wide dissemination of the recorded data. If during the spectral scan, anomalies in the measured spectral irradiation are encountered, a warning message appears at the hard copy printer terminal 24. The terminal 24 preferably produces an audible warning signal to alert the operator. The printed warning message at the terminal 24 informs the operator of the nature of the problem and what portion of the spectra is affected. The operator can then take appropriate corrective measures before proceeding with further insolation measurements.

The radiation measuring system 10 is powered from any conventional 110 VAC, 60 Hz, power source (not shown).

Thus it has been shown and described a radiation measuring system 10 designed for measuring the available solar flux at a site on a consistently reliable basis, which system 10 satisfies the objects and advantages set forth above.

Since certain changes may be made in the present disclosure, it is intended that all matter described in the foregoing specification or shown in the accompanying drawings, be interpreted in an illustrative and not in a limiting sense.

What is claimed is:

1. A radiometer comprising:
   (a) an integrating sphere for admitting radiation;
   (b) means for intermittently interrupting the admission of radiation in said integrating sphere;
   (c) a source of reference illumination for calibrating said radiometer;
   (d) said source of reference illumination being a structured spectral source;
   (e) said structured spectral source being a continuous source with a structured spectral filter having strong absorption bands.

2. The radiation detector system of claim 1 wherein said source of reference illumination is a mercury lamp.

3. The radiometer of claim 1 wherein said integrating sphere has a 180° field of view and a cosine response.

4. The radiation detector system of claim 1 wherein said means for intermittently interrupting is a spherical chopper rotatably mounted about said diffuser.

5. A flux measuring system for providing calibrated data comprising:
   (a) a diffuser for admitting radiation therein;
   (b) means for intermittently interrupting the admission of radiation into said diffuser;
   (c) means for measuring the radiation admitted into said diffuser; and
   (d) sources of reference illumination for continuously calibrating said system in wavelength and/or intensity;
   (e) said diffuser being an integrating sphere having a 180° field of view and a cosine response, and said means for intermittently interrupting is a spherical chopper rotatably mounted about said integrating sphere.

6. A flux measuring system for providing calibrated data comprising:
   (a) an integrating sphere for receiving radiation;
   (b) means for intermittently interrupting the receiving of radiation by said integrating sphere;
   (c) means for measuring the radiation received by said integrating sphere;

(d) sources of reference illumination for continuously calibrating said system in wavelength and/or intensity;

(e) said means for measuring said radiation including a monochromater and a circuit for converting the radiation measured by said monochromater into a signal suitable to computer use;

(f) said source of reference illumination being a continuous source designed to provide spectral calibration and/or broad band calibration.

7. The flux measuring system of claim 6 further including a programmable microcomputer for processing said signal converted by said circuit.

8. A method for measuring solar flux comprising:
(a) admitting solar radiation into an integrating sphere having a 180° field of view and a cosine response;
(b) periodically interrupting said admitting of solar radiation into said integrating sphere;
(c) effecting both a dark measurement and a measurement of said admitted solar radiation in said integrating sphere;
converting said dark measurement and said measurement of said admitted solar radiation into signals suitable for computer use; and (e) processing and recording said signals for both immediate and later use.

9. A method for measuring radiation as an absolute irradiance spectra comprising:
(a) admitting radiation into an integrating sphere having a 180° field of view and a cosine response;
(b) periodically interrupting said admitting of said radiation into said integrating sphere;
(c) providing a periodically interrupted wavelength calibration radiation into said integrating sphere to effect dynamic wavelength calibration thereof;
(d) providing a periodically interrupted reference illumination into said integrating sphere to effect complete spectral response calibration thereof;
(e) effecting both a dark measurement and measurements of said admitted radiation, of said wavelength calibration radiation, and of said reference illumination in said integrating sphere;
(f) converting all said measurements into signals suitable for computer use; and
(g) processing and recording said signals.

10. The method of claims 8 or 9 further including the step of monitoring for anomalous attenuations in the measured admitted radiation.

* * * * *